Dec. 18, 1928.　　　　　　　S. W. CADY　　　　　　　1,695,532
CHAFFER FOR THRASHERS
Filed June 6, 1927　　　2 Sheets-Sheet 1
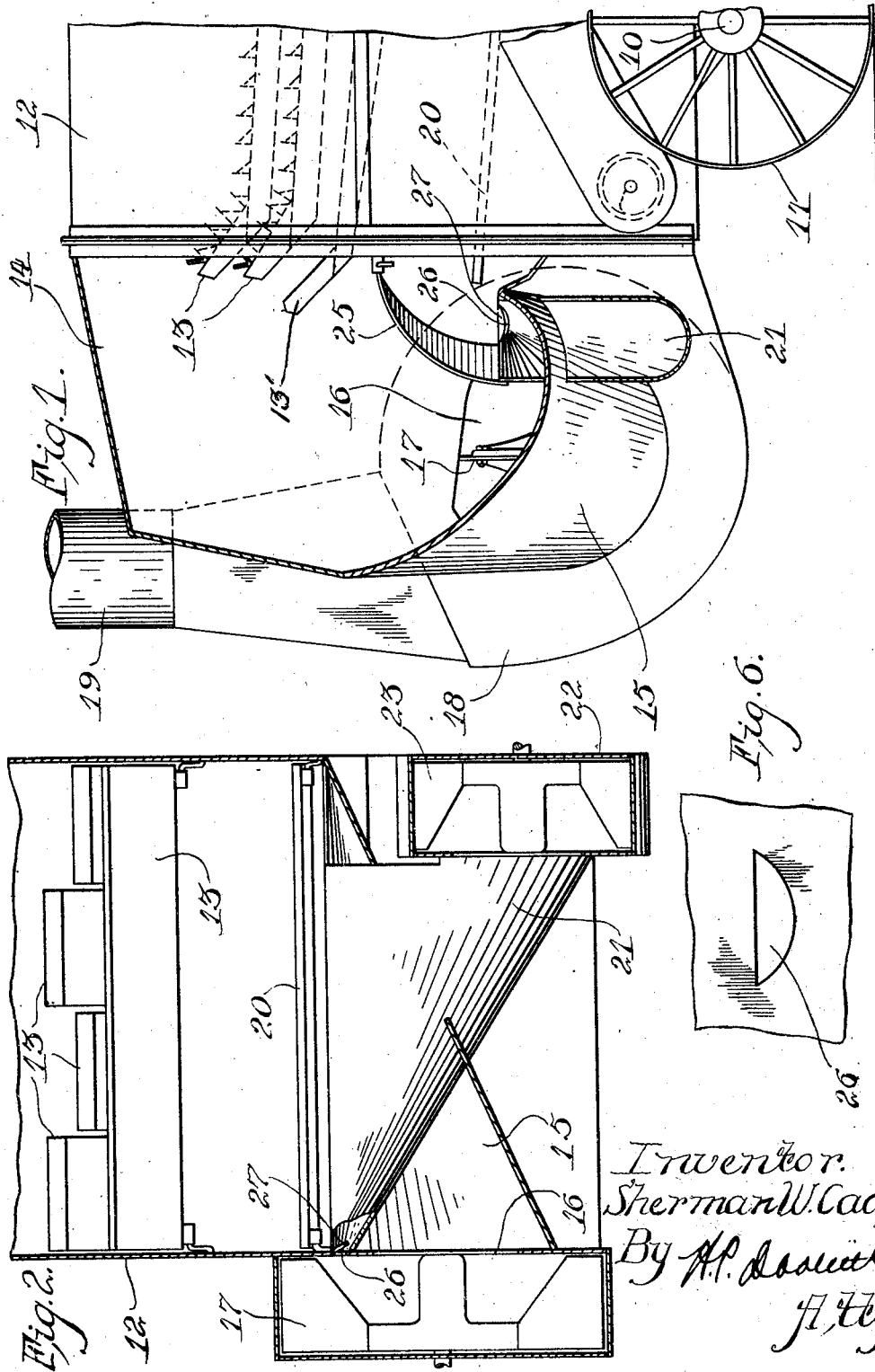

Dec. 18, 1928.  
S. W. CADY  
CHAFFER FOR THRASHERS  
Filed June 6, 1927  
1,695,532  
2 Sheets-Sheet 2
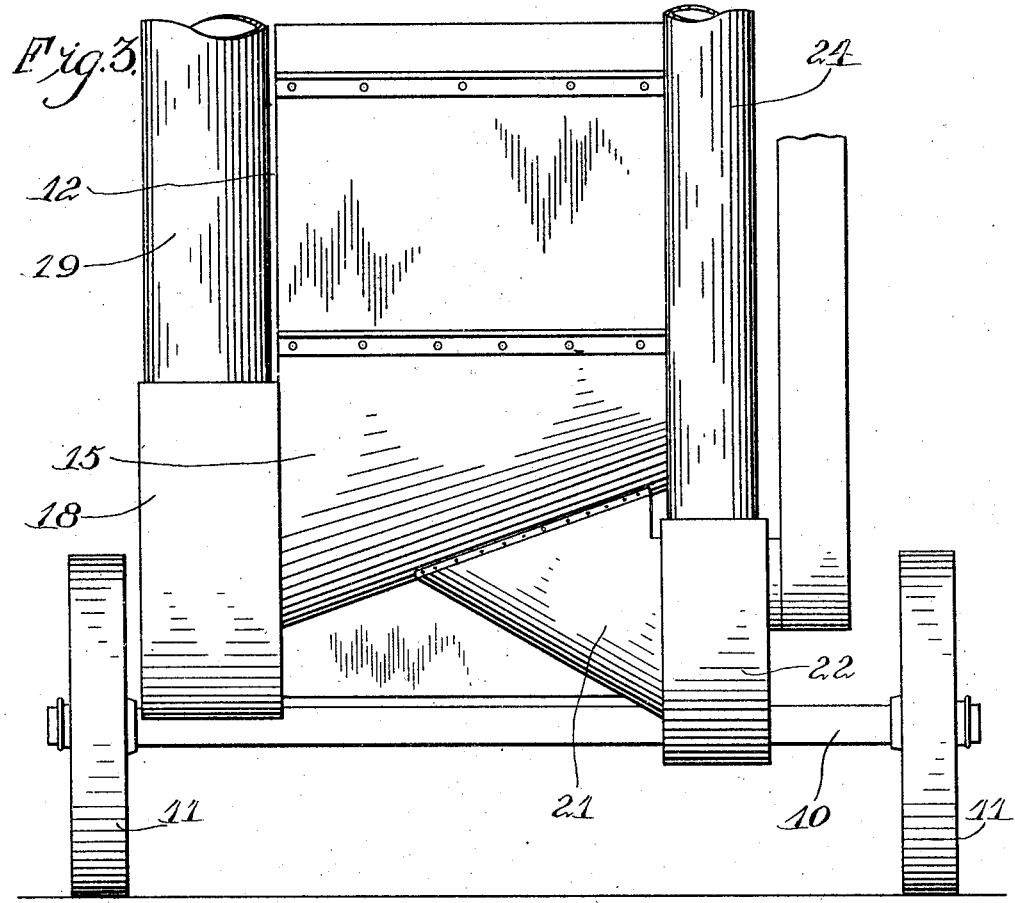
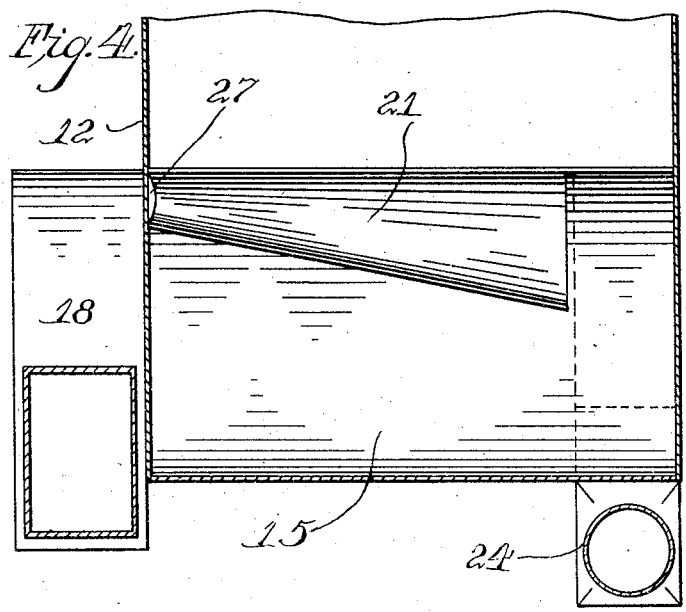
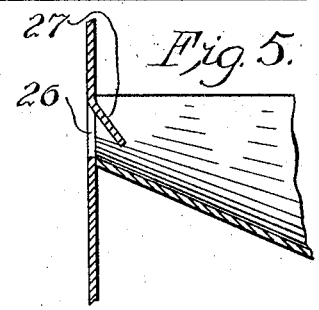
Inventor.  
Sherman W. Cady,  
By H.P. Doolittle  
Atty.

Patented Dec. 18, 1928.

1,695,532

UNITED STATES PATENT OFFICE.

SHERMAN W. CADY, OF RICHMOND, INDIANA, ASSIGNOR TO INTERNATIONAL HARVESTER COMPANY, A CORPORATION OF NEW JERSEY.

CHAFFER FOR THRASHERS.

Application filed June 6, 1927. Serial No. 196,671.

This invention relates to thrashing machines and particularly to a chaffer attachment for such machines.

Thrashers as now known and used in the art embody a body in which is arranged mechanism for separating the grain from the straw, there being a straw housing and straw chute at the discharge end of the machine, which catches the straw, and then by means of a wind stacker discharges the straw from this housing and forms it into a pile or stack exteriorly of the machine.

Thrasher men sometimes deem it advisable to separate the chaff from the grain and straw, and, by means of a secondary chute and wind stacker mechanism, similarly stack or pile the chaff exteriorly of the machine.

With these general thoughts in mind, the objects of this invention are generally to improve and simplify the construction and operation of the so-called chaffer attachments for thrashing machines; to provide such an attachment which will utilize air pressures built up adjacent the periphery of the straw stacker fan for moving the chaff to the chaffer stacker fan; and, lastly, to provide a simple, effective means embodying an opening and a deflector which will direct these air pressures in the most effective manner to accomplish this result.

Briefly, these very desirable objects are achieved in combination with a conventional type of thrasher, embodying a body having therein straw walkers which discharge straw into a straw housing, and a chaffer screen for catching the chaff, of a straw chute at the bottom of the straw housing for catching the straw from the straw walkers, associated with a suction, straw, wind stacker fan for taking the straw from the straw housing and straw chute, there further being a second or chaff wind stacker fan which takes the chaff from a chaffer chute fed by the chaffer screen to expel the chaff from the machine. The straw suction fan of the straw wind stacker builds up air pressures adjacent its periphery and, by means of an opening and a deflector in the fan housing adjacent this portion of the straw stacker fan, the air pressures are directed along the bottom of the chaffer chute to move the chaff in the direction of the chaffer suction fan, thereby obviating the use of mechanical means, such as augers or the like, for advancing chaff into the chaff blower fan.

In the accompanying sheets of drawings illustrating one form which this invention may assume in practice:

Figure 1 is a general side elevational view of the rear end of a thrasher with the proximate side of the straw housing and chaffer blower removed;

Figure 2 is a rear vertical sectional view centrally through the straw housing, showing the two wind stacker fans;

Figure 3 is a rear elevational view of the thrasher with the chaffer attachment in place;

Figure 4 is a horizontal sectional view through the straw housing, showing the arrangement of the straw and chaffer chutes;

Figure 5 is an enlarged sectional rear elevational detail view of the opening and deflector associated with the chaffer chute; and Figure 6 is an exterior face view of the wall of the straw stacker fan, showing on an enlarged scale, the opening.

Looking to Figures 1 and 3, it will be seen that the thrasher is of standard construction in most respects, it embodying a rear axle 10 journaled in carrying wheels 11, which axle supports a thrasher body 12, adjacent the upper end of which is arranged the usual set of straw walker discharge elements 13, which discharge the straw into a straw housing 14 having an inclined bottom or chute 15, which leads into an opening 16 leading to a straw wind stacker suction fan 17 enclosed in a fan housing 18 communicating with the usual discharge wind stacker pipe 19 for stacking the straw in a pile on the ground exteriorly of the machine. A return pan 13' is arranged under the straw walkers.

Some thrasher men, in addition to merely separating the grain from the straw and stacking the straw in the manner described, deem it desirable also to separate the chaff and stack it on the ground in a pile independently of the straw pile. This invention comprehends the employment of a simple and effective structure for accomplishing this result. It will be described.

Beneath the return pan 13', the body of the thrasher includes a chaffer screen 20 which is arranged to catch the chaff and discharge it into an oppositely inclined chaffer chute 21, which chute leads into another or secondary blower housing 22, which encloses a suction blower fan 23 leading into a stacker discharge pipe 24, which mechanism just described constitutes the chaffer blower, or wind stacker.

The body of the thrasher carries a partition, or shield, 25, which, as shown in Figure 1, is arranged between the blower 16 and chaffer screen 20 and between the oppositely inclined straw chute 15 and chaffer chute 21.

In operation, the chaff is directed by the screen 20 into the chaffer chute 21, the partition 25 being inclined in a manner to serve also as a chaff deflector, as will be obvious. The chaff being light, fluffy stuff, will accumulate on the chute 21, and, as its mass is too light sometimes to cause it to move by gravity down the inclined chute 21, it becomes necessary to provide some means for moving the chaff into the suction fan 23.

It will be obvious to those skilled in this art that the straw stacker fan 17 at its center where it receives the straw from the straw chute 15 is all suction, but at its periphery it is constantly building up pressures for blowing the straw through the pipe 19 and out of the machine. This invention contemplates the utilization of some of this air pressure for moving the straw along the bottom of the chaffer chute 21 in the direction of the chaffer wind stacker fan 23. This desirable result is accomplished by providing the inner wall of the straw fan housing 18 with a hole 26 located at the head end of the chaff chute 21, said hole having a rounded bottom to conform with the curvature of the rounded bottom of the chaff chute 21. The hole 26 is formed in the wall by slitting the same and pressing it inwardly, which leaves a flap 27 to function as a deflector to insure that the air will pass along the chaff chute 21 closely adjacent to its bottom in a manner most effective to move the chaff therealong. Thus, this simple expedient of utilizing some of the air pressure from the straw wind stacker fan 17 obviates the necessity of employing such mechanical means as an auger or the like for moving the chaff to the chaffer fan.

In operation, straw is directed by the straw walkers 13 over the shield, or partition, 25 and onto the inclined chute bottom 15 of the straw housing 14 where the suction fan 17 of the wind stacker 19 is effective to suck the straw and expel it from the machine to form a straw pile. The chaffer screen 20 discharges the chaff caught beneath the straw walkers 13 and discharges it into the inclined chaffer chute 21, below the shield or partition 25, where the moon-shaped opening 26 in the wall of the blower housing 18 adjacent the periphery of the fan 17 where the fan is building up air pressures, directs a strong, continuous blast of air through said opening 26 and along the bottom of the chaffer chute 21 to move the chaff into the chaffer blower 23 to be expelled from the machine by the wind stacker pipe 24 thereof into a separate pile, as has been described.

From the above detailed disclosure, it must now be obvious that a simple and effective means has been provided for separating the chaff and directing it into a chaff wind stacker, forming it into a separate pile.

It is the intention herein to cover all such changes and modifications of this invention as do not materially depart therefrom, as is indicated by the scope of the appended claims.

What is claimed is:

1. The combination with a thrasher having a straw discharge chute and a windstacker including a housing, of a chaffer screen, a chaff discharge chute, and a second windstacker, there being an opening in the straw windstacker housing whereby air under pressure is directed along the chaffer chute in the direction of the second windstacker.

2. The combination with a thrasher having an inclined straw discharge chute and a windstacker including a housing, of a chaffer screen, an oppositely inclined chaff discharge chute, and a second windstacker, there being an opening in the straw windstacker housing whereby air under pressure is directed across the chaffer chute in the direction of the second windstacker.

3. The combination with a thrasher having a straw discharge chute and a windstacker fan, of a chaffer screen, a chaff discharge chute, and a second windstacker fan, and means for directing air under pressure from the first fan along the chaffer chute to the second fan.

4. The combination with a thrasher having an inclined straw discharge chute and a windstacker fan having a housing, of a chaffer screen, an oppositely inclined chaff discharge chute, a second windstacker fan, and means adjacent the periphery of the straw fan including an opening in the straw fan housing for directing air under pressure along the bottom of the chaffer chute to the chaffer fan.

5. The combination with a thrasher having a straw discharge chute and a windstacker fan including a housing, means in the thrasher for directing straw to said chute, of a chaffer screen, a chaff discharge chute, a second windstacker fan, the chaffer screen directing chaff to the chaff chute, a partition between the straw and chaff directing means and the two chutes, and means adjacent the straw fan including an opening in the straw fan housing for directing air from the straw fan under pressure along the chaffer chute to move the chaff thereon to the chaff fan.

6. The combination with a thrasher having a straw discharge chute and a windstacker fan including a housing, of a chaffer screen, a round bottomed chaff discharge chute adjacent the straw discharge chute, a windstacker fan for the chaff chute, there being an opening in the housing wall adjacent the straw fan having a form corresponding to the curvature of the bottom of the chaff chute, whereby air under pressure is directed across the bottom of the chaffer chute from the straw fan in the direction of the chaffer fan.

7. In a thrasher, means for moving straw rearwardly, a transversely inclined chute for receiving the straw, a fan including a housing for drawing the straw out of the thrasher, a chaffer screen, a second transverse chute inclined oppositely to the first chute and receiving chaff from the chaffer screen, a partition between the chutes, a fan for drawing chaff out of the chaffer chute, and deflector means including an opening in the straw fan housing for utilizing the back pressure of said fan to direct a blast of air across the chaffer chute in the direction of the chaff fan.

8. In a thrasher, means for moving straw rearwardly, a transversely inclined chute for receiving the straw, a fan including a housing for drawing the straw out of the thrasher, a chaffer screen, a second transverse chute inclined oppositely to the first chute and having a rounded bottom for receiving chaff from the chaffer screen, a partition separating the straw moving means and chaffer screen, said partition also separating the two inclined chutes, a fan for drawing chaff out of the chaffer chute, and deflector means including an opening in the housing of the straw fan, said opening having a rounded under side conforming with the round bottomed chaffer chute to direct back pressure air from the straw fan across the chaffer chute in the direction of the chaff fan.

In testimony whereof I affix my signature.

SHERMAN W. CADY.